US007243056B2

(12) United States Patent
Olhofer et al.

(10) Patent No.: US 7,243,056 B2
(45) Date of Patent: Jul. 10, 2007

(54) STRATEGY PARAMETER ADAPTATION IN EVOLUTION STRATEGIES

(75) Inventors: Markus Olhofer, Seligenstadt (DE); Bernhard Sendhoff, Obertshausen (DE)

(73) Assignee: Honda Research Institute Europe GmbH (DE)

( * ) Notice: Subject to any disclaimer, the term of this patent is extended or adjusted under 35 U.S.C. 154(b) by 882 days.

(21) Appl. No.: 10/080,742

(22) Filed: Feb. 21, 2002

(65) Prior Publication Data

US 2002/0165703 A1 Nov. 7, 2002

(30) Foreign Application Priority Data

Feb. 26, 2001 (EP) .................. 01104723

(51) Int. Cl.
*G06G 7/48* (2006.01)
(52) U.S. Cl. ............ 703/7; 703/2; 703/6; 706/15; 706/26
(58) Field of Classification Search .......... 703/2, 703/7, 6; 706/15, 26
See application file for complete search history.

(56) References Cited

U.S. PATENT DOCUMENTS

| 5,074,752 A | 12/1991 | Murphy et al. |
| 5,136,686 A | 8/1992 | Koza |
| 5,148,513 A | 9/1992 | Koza et al. |
| 5,265,830 A | 11/1993 | Allen |
| 5,319,781 A | 6/1994 | Syswerda |
| 5,355,528 A | 10/1994 | Roska et al. |
| 5,461,570 A | 10/1995 | Wang et al. |
| 5,487,130 A | 1/1996 | Ichimori et al. |
| 5,541,848 A | 7/1996 | McCormack et al. |
| 5,724,258 A | 3/1998 | Roffman |
| 5,819,244 A | 10/1998 | Smith |
| 5,924,048 A | 7/1999 | McCormack et al. |
| 6,285,968 B1 | 9/2001 | Motoyama et al. |

(Continued)

FOREIGN PATENT DOCUMENTS

EP    1 205 863 A1 * 5/2002

(Continued)

OTHER PUBLICATIONS

Bäck, T. et al. "Evolutionary Computation: Comments on the History and Current State." IEEE Transactions on Evolutionary Computation, Apr. 1997. vol. 1, No. 1, pp. 3-17.*

(Continued)

*Primary Examiner*—Paul Rodriguez
*Assistant Examiner*—Ayal Sharon
(74) *Attorney, Agent, or Firm*—Fenwick & West LLP (57) ABSTRACT

The present invention relates to a optimization method based on an evolution strategy according to which a model/structure/shape/design to be optimized is described by parameter sets comprising object parameters. The object parameters are mutated to create offsprings of the parameter set. The quality of the offsprings is evaluated. The parameter set furthermore comprises at least one strategy parameter representing the step-size of the mutation (f.e. the variance of the normal distribution) of associated object parameters. The number of object parameters as well as the number of associated strategy parameters can be adapted during the optimization process. The value of newly inserted strategy parameters can be estimated based on the information of correlated object parameters.

22 Claims, 10 Drawing Sheets

U.S. PATENT DOCUMENTS

| | | | |
|---|---|---|---|
| 6,292,763 B1 | 9/2001 | Dunbar et al. | |
| 6,430,993 B1* | 8/2002 | Seta | 73/146 |
| 6,449,603 B1 | 9/2002 | Hunter | |
| 6,516,309 B1 | 2/2003 | Eberhart et al. | |
| 6,549,233 B1 | 4/2003 | Martin | |
| 6,578,018 B1 | 6/2003 | Ulyanov | |
| 6,606,612 B1 | 8/2003 | Rai et al. | |
| 6,654,710 B1 | 11/2003 | Keller | |
| 6,662,167 B1 | 12/2003 | Xiao | |
| 6,781,682 B1* | 8/2004 | Kasai et al. | 356/138 |
| 6,879,388 B2* | 4/2005 | Kasai et al. | 356/138 |
| 6,928,434 B1 | 8/2005 | Choi et al. | |
| 6,950,712 B2 | 9/2005 | Ulyanov et al. | |
| 7,043,462 B2* | 5/2006 | Jin et al. | 706/13 |
| 7,047,169 B2 | 5/2006 | Pelikan et al. | |
| 2002/0099929 A1* | 7/2002 | Jin et al. | 712/220 |
| 2002/0138457 A1 | 9/2002 | Jin et al. | |
| 2002/0165703 A1 | 11/2002 | Olhofer et al. | |
| 2003/0030637 A1 | 2/2003 | Grinstein et al. | |
| 2003/0055614 A1 | 3/2003 | Pelikan et al. | |
| 2003/0065632 A1 | 4/2003 | Hubey | |
| 2003/0191728 A1 | 10/2003 | Kulkami et al. | |
| 2004/0014041 A1 | 1/2004 | Allan | |
| 2004/0030666 A1 | 2/2004 | Ulyanov et al. | |
| 2004/0034610 A1 | 2/2004 | Marra et al. | |
| 2004/0049472 A1 | 3/2004 | Hayashi et al. | |
| 2005/0209982 A1 | 9/2005 | Jin et al. | |
| 2005/0246297 A1 | 11/2005 | Chen et al. | |

FOREIGN PATENT DOCUMENTS

| | | |
|---|---|---|
| EP | 1 205 877 A1 * | 5/2002 |
| EP | 1205877 A1 | 5/2002 |
| WO | WO 02/057946 A1 | 7/2002 |

OTHER PUBLICATIONS

Carson, Y. et al. "Simulation Optimization: Methods and Applications." Proc. of the 29th Winter Simulation Conf. 1997. pp. 118-126.*

Bäck, T. et al. "A Survey of Evolution Strategies." Proc. of the 4th Int'l Conf. on Genetic Algorithms. Jul. 1991. pp. 2-9.*

Sbalzarini, I. et al. "Evolutionary Optimization for Flow Experiments." Center of Turbulence Research Annual Research Briefs. 2000.*

Müller, S. et al. "Application of Machine Learning Algorithms to Flow Modeling and Optimization." Center of Turbulence Research Annual Research Briefs. 1999.*

Koumoutsakos, P. et al. "Evolution Strategies for Parameter Optimization in Jet Flow Control." Center of Turbulence Research Annual Research Briefs. 1998.*

Pittman, J. et al. "Fitting Optimal Piecewise Linear Functions Using Genetic Algorithms". IEEE Transactions on Pattern Analysis and Machine Intelligence. Jul. 2000. vol. 22, Issue 7, pp. 701-718.*

Olhoferm M., Y. Jin and B. Sendhoff. "Adaptive Encoding for Aerodynamic Shape Optimization Using Evolution Strategies." Proceedings of IEEE Congress on Evolutionary Computation. May 2001. vol. 1, pp. 576-583.*

Jin, Y., M. Olhofer, and B. Sendhoff, "A Framework for Evolutionary Optimization with Approximate Fitness Functions." IEEE Transactions on Evolutionary Computation. 2002. vol. 6, Ed. 5, pp. 481-494.*

Nashvili, M., M. Olhofer. and B. Sendhoff, "Morphing Methods in Evolutionary Design Optimization." Genetic and Evolutionary Computation Conference (GECCO '05). Jun. 25-29, 2005. pp. 897-904.*

Hasenjäger, M., T. Sonoda, B. Sendhoff, and T. Arima. "Three Dimensional Evolutionary Aerodynamic Design Optimization with CMA-ES." Genetic and Evolutionary Computation Conference (GECCO '05). Jun. 25-29, 2005. pp. 2173-2180.*

Angeline, Peter J., "Adaptive And Self-Adaptive Evolutionary Computations," Computational Intelligence: A Dynamic Systems Perspective, Palaniswami et al. (EDS), 1995, pp. 152-163.

Elben, Agoston E., Hinterding, Robert, and Michalewicz, Zbigniew, "Parameter Control in Evolutionary Algorithms," IEEE Transactions On Evolutionary Computation, vol. 3, No. 2, 1999, pp. 124-141.

Fagarasan, Florin, Negoita, Dr. Mircea Gh., "A Genetic Algorithm With Variable Length Genotypes. Applications In Fuzzy Modeling," Proceedings Of the Fourth European Congress on Intelligent Techniques, EUFIT '96, vol. 1, 2-5, Sep. 1996, pp. 405-409.

Srikanth, R., George, R., and Warsi, N., "A Variable-Length Genetic Algorithm For Clustering And Classification," Pattern Recognition Letters, North-Holland Publ. Amsterdam, NL, vol. 16, No. 8, Aug. 1, 1995, pp. 789-800.

Weinert, Klaus, and Mehnen, Jörn, "Discrete NURBS-Surface Approximation Using An Evolutionary Strategy," REIHE CI 87/00, SFB 531, 2000, pp. 1-7.

European Search Report, European Application No. 01104723, Aug. 22, 2001, 3 pages.

Hruschka, E.R. et al., "Using a Clustering Genetic Algorithm for Rule Extraction from Artificial Neural Networks," IEEE, 2000, pp. 199-206.

Kim, H.S. et al., "An Efficient Genetic Algorithm with Less Fitness Evaluation by Clustering," IEEE, 2001, pp. 887-894.

Li, M. et al, "Hybrid Evolutionary Search Method Based on Clusters," IEEE Transaction on Pattern Analysis and Machine Intelligence, Aug. 2001, pp. 786-799, vol. 23, No. 8.

Liu, F. et al., "Designing Neural Networks Ensembles Based on the Evolutionary Programming," Proceedings of the Second International Conference on Machine Learning and Cybernetics, Xi'an, IEEE, Nov. 2-5, 2003, pp. 1463-1466.

Zhou, Z.H. et al., "Genetic Algorithm Based Selective Neural Networks Ensemble," Proceedings of the 17th International Joint Conference on Artificial Intelligence, IEEE, 2001, pp. 797-802, vol. 2.

Agrez, D. "Active Power Estimation by Averaging of the DFT Coefficients," Proceedings of the 17th IEEE.

Instrumentation and Measurement Technology Conference, May 1-4, 2000, pp. 630-635, vol. 2.

Baluja, S. et al., "Combining Multiple Optimization Runs With Optimal Dependency Trees," Jun. 30, 1997, 12 pages, CMU-CS-97-157, Justsystem Pittsburgh Research Center, Pittsburgh, PA and School Of Computer Science, Carnegie Mellon University, Pittsburgh, PA.

Baluja, S., "Population-Based Incremental Learning: A Method For Integrating Genetic Search Based Function Optimization And Competitive Learning," Population Based Incremental Learning, Jun. 2, 1994, pp. 1-41, CMU-CS-94-163, School Of Computer Science, Carnegie Mellon University, Pittsburgh, PA.

Bosman, P. et al., "An Algorithmic Framework For Density Estimation Based Evolutionary Algorithms," Dec. 1999, pp. 1-63, Department Of Computer Science, Utrecht University, Utrecht, The Netherlands.

Bosman, P. et al., "IDEAs Based On The Normal Kernels Probability Density Function," Mar. 2000, pp. 1-16, Department Of Computer Science, Utrecht University, Utrecht, The Netherlands.

Bosman, P. et al., "Mixed IDEAs," Dec. 2000, pp. 1-71, UU-CS-2000-45, Institute Of Information And Computing Sciences, Utrecht University, Utrecht, The Netherlands.

Bosman, P. et al., "Negative Log-Likelihood And Statistical Hypothesis Testing As The Basis Of Model Selection In IDEAs," Aug. 2000, pp. 1-17, Department Of Computer Science, Utrecht University, Utrecht, The Netherlands.

Branke, J. et al., "Faster Convergence By Means Of Fitness Estimation," Oct. 1, 2002, pp. 1-9, Institute AIFB, University of Karlsruhe, Karlsruhe, Germany.

Chen Y. et al., "Feature Subimage Extraction for Cephalogram Landmarking", Proc. of the 20th Annual International Conference of the IEEE Engineering in Medicine and Biology Society, Oct. 29, 1998, pp. 1414-1417.

Crump, "Numerical Inversion of Laplace Transforms Using a Fourier Series Approximation," Journal of the ACM(JACM), Jan. 1976, pp. 89-96, vol. 23, No. 1.

Dasgupta, D. et al., "Evolutionary Algorithms in Engineering Applications," 1997, 3-23, Springer-Verlag.

Dash et al., "Genetic Optimization of a Self Organizing Fuzzy-Neural Network for Load Forecasting," IEEE Power Engineering Society Winter Meeting, Jan. 23-27, 2000, pp. 1011-1016, vol. 2.

Deb, K. et al., "A Computationally Efficient Evolutionary Algorithm For Real-Parameter Optimization," KanGAL Report Number 2002003, Apr. 11, 2002, pp. 1-21, Kanpur Genetic Algorithms Laboratory, (KanGAL), Indian Institute Of Technology Kanpur, Tsutsui Kanpur, India.

Deb, K., "Evolutionary Algorithms for Multi-Criterion Optimization in Engineering Design," In Miettinen et al., Evolutionary Algorithms in Engineering and Computer Science, 1999, pp. 135-161, John Wiley and Sons, Ltd., Chichester, UK.

Deb, K. et al., "Self-Adaptation In Real-Parameter Genetic Algorithms With Simulated binary Crossover," GECCO '99/Genetic Algorithms, 8 pages, Kanpur Genetic Algorithms Laboratory (KanGAL), Department of Mechanical Engineering, Indian Institute Of Technology Kanpur, India and Department Of Computer Science/XI, University of Dortmund, Dortmund, Germany, 1999.

Deb, K. et al., "Stimulated Crossover For Continuous Search Space," Nov. 1994, pp. 1-33, IITK/ME/SMD-94027, Convenor, Technical Reports, Department Of Mechanical Engineering, Indian Institute Of Technology, Kanpur, India.

De Bonet, J. et al., "MIMIC: Finding Optima By Estimating Probability Densities," Advances in Neural Information Processing Systems, 1997, 8 pages, MIT Press, Cambridge, MA.

Emmerich, M. et al., "Metamodel—Assisted Evolution Strategies," PPSN VII, LNCS 2439, 2002, pp. 361-370, Springer Verlag, Berlin, Heidelberg.

Eshelman, L. et al., "Crossover Operator Biases: Exploiting the Population Distribution," Proceedings of the Seventh International Conference on Genetic Algorithms, 1997, pp. 354-361.

European Search Report, EP Application No. 00124824.4, Jun. 14, 2001, 3 pages.

European Search Report, EP Application No. 0124825, May 14, 2001, 3 pages.

European Search Report, EP Application 0410194, Jun. 7, 2006, 3 pages.

Fukuda, K., "What is Voronol Diagram in $R^d$ ?" Aug. 26, 2004, [online] [Retrieved on Aug. 18, 2005] Retrieved from the Internet <URL:http://www.ifor.math.ethz.ch/~fukuda/polyfaq/node29.html>.

Graves, R.W. et al., "Acoustic Wavefield Propagation Using Paraxial Explorators," ACM, 1988, pp. 1157-1175.

Grierson, D.E. et al., "Optimal Sizing, Geometrical and Topological Design Using a Genetic Algorithm", Structural Optimization, 1993, pp. 151-159, vol. 6.

Guerin, "ObjectGarden: Evolving the Behavior of Agents via Natural Selection on Weights and Topologies of Neural Networks," May 1999, pp. 1-5.

Gupta, N. et al., "Automated Test Data Generation Using an Iterative Relaxation Method," Proceedings of the $6^{th}$ ACM SIGSOFT International Symposium on Foundation of Software Engineering, ACM SIGSOFT Software Engineering Notes, Nov. 1998, pp. 238-244, vol. 23, No. 6.

Harik, G. et al., "The Compact Genetic Algorithm," Illigal Report No. 97006, Aug. 1997, pp. 1-21, Illinois Genetic Algorithms Laboratory, Department Of General Engineering, University Of Illinois At Urbana-Champaign, Urbana, IL.

Harik, G. et al., "The Compact Genetic Algorithm," IEEE, 1998, pp. 523-526.

Harik, G., "Linkage Learning Via Probabilistic Modeling In The ECGA," Illigal Technical Report 99010, Jan. 1999, 19 pages, Illinois Genetic Algorithms Laboratory, Department of General Engineering, Urbana, IL.

Ishibuchi, H. et al., "Local Search Procedures in A Multi-Objective Genetic Local Search Algorithm For Scheduling Problems," IEEE, 1999, pp. 685-670.

Jain, A.K. et al., "Data Clustering: A Review," ACM Computing Surveys, Sep. 1999, pp. 264-323, vol. 31, No. 3, Michigan State University, Indian Institute Of Science and The Ohio State University.

Jimenez, D. et al., "Dynamically Weighed Ensemble Neural Networks For Classification," IEEE, 1998, pp. 753-756, The University Of Texas Health Science Center at San Antonio.

Jin, Y. et al., "A Framework For Evolutionary Optimization With Approximate Fitness Functions," IEEE Transactions On Evolutionary Computation, Oct. 2002, pp. 481-494, vol. 6, No. 5.

Jin Y. et al., "On Generating FC3 Fuzzy Rule Systems from Data Using Evolution Strategies," IEEE Transactions on Systems, Man and Cybernetics, Part B, Dec. 1999, pp. 829-845, vol. 29, No. 6.

Khan, N. et al., "Multi-Objective Bayesian Optimization Algorithm," IlliGAL Report No. 2002009, Mar. 2002, pp. 1-10, Illinois Genetic Algorithms Laboratory, University Of Illinois At Urbana-Champaign, Urbana, IL.

Kim, H-S. et al., "An Efficient Genetic Algorithm with Less Fitness Evaluation by Clustering," Proceedings of the 2001 Congress on Evolutionary Computation, IEEE, May 27-30, 2001, pp. 887-894.

Kita, H. et al., "Multi-Parental Extension of the Unimodel Normal Distribution Crossover for Real-Coded Genetic Algorithms," IEEE, 1999, pp. 1581-1588.

Knowles, J. et al., "The Pareto Archived Evolution Strategy: A New Baseline Algorithm For Pareto Multiobjective Optimization," IEEE, 1999, pp. 98-105.

Larranaga, P. et al., "Optimization By Learning And Simulation Of Bayesian And Gaussian Networks," Technical Report EHU-KZAA-IK-4/99, Dec. 31, 1999, pp. 1-70, Intelligent Systems Group, Dept. Of Computer Science And Artifical Intelligence, University Of The Basque Country.

Li et al., "Text Enhancement in Digital Video Using Multiple Frame Integration," Proceedings of the Seventh ACM International Conference on Multimedia (Part 1), Oct. 1999, pp. 19-22.

Liu, Y. et al., "Negatively Correlated Neural Networks Can Produce Best Ensembles," Australian Journal Of Intelligent Information Processing Systems, Spring/Summer 1997, pp. 176-185, Computational Intelligence Group, School Of Computer Science, University College, Australian Defence Force, The University Of South Wales, Canberra, Australia.

Liu, Y. et al., "Simultaneous Training Of Negatively Correlated Neural Networks In An Ensemble," IEEE Transactions On Systems, Man, And Cybernetics—Part B: Cybernetics, Dec. 1999, pp. 716-725, vol. 29, No. 6.

Lobo, F. et al., "Extended Compact Genetic Algorithm In C++, "IlliGAL Report 99016, Jun. 1999, pp. 1-4, Illinois Genetic Algorithms Laboratory, Department Of General Engineering, University Of Illinois At Urbana-Champaign, Urbana, IL.

Mitlohner, "Classifier Systems and Economic Modeling," Proceedings of the Conference on Designing the Future, ACM SIGAPL APL Quote Quad, Jun. 1996, pp. 77-86, vol. 26, No. 4.

Muhlenbein, H. et al., "Evolutionary Synthesis Of Bayesian Networks For Optimization," MIT Press Math6x9, Sep. 1999, pp. 1-27.

Muhlenbein, H. et al., "The Factorized Distribution Algorithm For Additively Decomposed Functions," Proceedings Of The 1999 Congress On Evolutionary Computation, 1999, IEEE Press, pp. 752-759, Real World Computing Partnership, Theoretical Foundation GMD Laboratory, Sankt Augustin, Germany.

Muhlenbein, H. et al., "FDA—A Scalable Evolutionary Algorithm For The Optimization Of Additively Decomposed Functions," Evolutionary Computation, 1999, pp. 45-68, vol. 7, No. 1, Theoretical Foundation GMD Lab, Real World Computing Partnership, GMD FZ Informationstechnik, St. Augustin.

Ono, I. et al., "A Real-Coded Genetic Algorithm for Function Optimization Using Unimodel Normal Distribution Crossover," Proceedings of the Seventh International Conference on Genetic Algorithms, pp. 246-253, 1997.

Ono, I. et al., "A Real-Coded Genetic Algorithm For Function Optimization Using The Unimodal Normal Distribution Crossover," Technical Papers, 1999, pp. 1-11, University Of Tokushima, Tokushima, Japan, National Defence Academy, Yokosuka, Japan and Tokyo Institute Of Technology, Yokohama, Japan.

Pelikan, M. et al., "BOA: The Bayesian Optimization Algorithm," IlliGAL Report No. 99003, Jan. 1999, pp. 1-12, Illinois Genetic Algorithms Laboratory, University Of Illinois At Urbana-Champaign, Urbana, IL.

Pelikan, M. et al., "Linkage Problem, Distribution Estimation, And Bayesian Networks," IlliGAL Report No. 98013, Nov. 1998, pp. 1-24, Illinois Genetic Algorithms Laboratory, University Of Illinois At Urbana-Champaign, Urbana, IL.

Pelikan, M. et al., "A Survey Of Optimization By Building And Using Probabilistic Models," IlliGAL Report No. 99018, Sep. 1999, pp. 1-11, Illinois Genetic Algorithms Laboratory, University Of Illinois At Urbana-Champaign, Urbana, IL.

Perrone, M. et al., "When Networks Disagree: Ensemble Methods For Hybrid Neural Networks," Oct. 27, 1992, 15 pages, Physics Department, Neuroscience Department, Institute For Brain And Neural Systems, Brown University, Providence, R.I., To Appear In "Neural Networks For Speech And Image Processing," R.J. Mammone, ed., Chapman-Hall, 1993.

Ratle, A., "Accelerating the Convergence of Evolutionary Algorithms by Fitness Landscape Approximation", Parallel Problem Solving from Nature—PPSN V. $5^{th}$ International Conference Proceedings, Sep. 1998, pp. 87-96.

Ratle, A., "Optimal Sampling Strategies for Learning a Fitness Model", Proc. of 1999 Congress on Evolutionary Computation, Jul. 9, 1999, pp. 2078-2085, vol. 3.

Redmond, J., "Actuator Placement Based on Reachable Set Optimization for Expected Disturbance", Journal of Optimization Theory and Applications, Aug. 1996, pp. 279-300, vol. 90, No. 2.

Rousseeuw, P., "Silhouettes: A Graphical Aid To The Interpretation And Validation Of Cluster Analysis," Journal Of Computational And Applied Mathmetics, 1987, pp. 53-65, vol. 20, University Of Fribourg, Fribourg, Switzerland.

Rudlof, S. et al., "Stochastic Hill Climbing With Learning By Vectors Of Normal Distributions," Aug. 5, 1996, pp. 1-11, Fraunhofer-Institut For Production Systems And Design Technology (IPK), Berlin.

Sendhoff, "Evolutionary Optimized Ontogenetic Neural Networks with Incremental Problem Complexity During Development," Proceedings of the 2000 Congress on Evolutionary Computation, Jul. 16-19, 2000, pp. 1443-1450, vol. 2.

Tsutsui, S. et al., "Evolutionary Alogrithm Using Marginal Histogram Models In Continuous Domain," IlliGAL Report No. 2001019, Mar. 2001, pp. 1-16, Illinois Genetic Algorithm Laboratory, University Of Illinois At Urbana-Champaign, Urbana, Illinois.

Tsutsui, S. et al., "Search Space Boundary Extension Method In Real-Coded Genetic Algorithms," Information Sciences, May 2001, pp. 229-247, vol. 133, No. 3-4, Department Of Management And Information Science, Hannan University, Osaka, Japan and Illinois Genetic Algorithms Laboratory, University Of Illinois At Urbana-Champaign, Urbana, IL.

Tsutsui, S. et al., "Simplex Crossover And Linkage Identifications: Single-Stage Evolution VS. Multi-Stage Evolution," IEEE, 2002, 6 pages, Department Of Management And Information, Hannan University, Osaka, Japan and Illinois Genetic Algorithms Laboratory, Department Of General Engineering, University Of Illinois At Urbana-Champaign, Urbana, IL.

Tsutsui, S. et al., "Probabilistic Model-Building Genetic Algorithms Using Marginal Histograms in Continuous Domain," KES'01, N. Baba et al., (Eds.), IOS Press, 2001, pp. 112-121, Department Of Management And Information, Hannan University, Osaka, Japan and Illinois Genetic Algorithms Laboratory, Department Of General Engineering, University Of Illinois At Urbana-Champaign, Urbana, IL.

Tuson, A. et al., "Adapting Operator Settings In Genetic Algorithms," Final Draft of The Paper Which Will Appear In *Evolutionary Computation*, Mar. 25, 1998, pp. 1-17.

Ueda, T. et al., "Efficient Numerical Optimization Technique Based On Real-Coded Genetic Algorithm," Genome Informatics, 2001, pp. 451-453, vol. 12, Graduate School of Bioresource And Bioenviromental Sciences, Kyushu University, Fukuoka, Japan and Department Of Biochemical Engineering and Science, Kyushu Institute Of Technology, Fukuoka, Japan.

Van Veldhuizen, D. A. et al., "Multiobjective Evolutionary Algorithms: Analyzing the State-of-the-Art," Evolutionary Computation, 2000, 125-147, vol. 8, No. 2, The MIT Press, Cambridge, MA.

Yao, X. et al., "Making Use Of Population Information in Evolutionary Artifical Neural Networks," IEEE Transactions On Systems, Man, And Cybernetics, Jun. 1998, pp. 417-425, vol. 28, No. 3.

Yu et al., "Genetic Algorithm Approach to Image Segmentation using Morphological Operations", Image Processing, ICIP 1998, IEEE, Oct. 1998, pp. 775-779, vol. 3.

Zhang, B., "A Bayesian Framework for Evolutionary Computation," IEEE, 1999, pp. 722-728.

\* cited by examiner

STRATEGY PARAMETER ADAPTATION IN EVOLUTION STRATEGIES

CROSS-REFERENCE TO RELATED APPLICATIONS

This application is related to and claims priority from European Patent Application No. 01 104 723.0 filed on Feb. 26, 2001.

FIELD OF THE INVENTION

The present invention relates to an optimization method based on an evolution strategy, to a method for optimizing spline coded structures on the basis of an evolution strategy, to a computer software for executing such a method as well as to the use of such a method for the optimization of the shape of aerodynamic or hydrodynamic structures.

BACKGROUND OF THE INVENTION

In the field of evolution strategy, basic principles of natural evolution are used for generating or optimizing technical structures. Basic operations are mutation and recombination as a method for modifying structures or parameters. To eliminate unfavorable modifications and to proceed with modifications which increase the overall quality of the system, a selection operation is used. Principles of the evolution strategy can be found for example in Rechenberg, Ingo (1994) "Evolutions strategie", Friedrich Frommann Holzboog Verlag.

Figure 1:
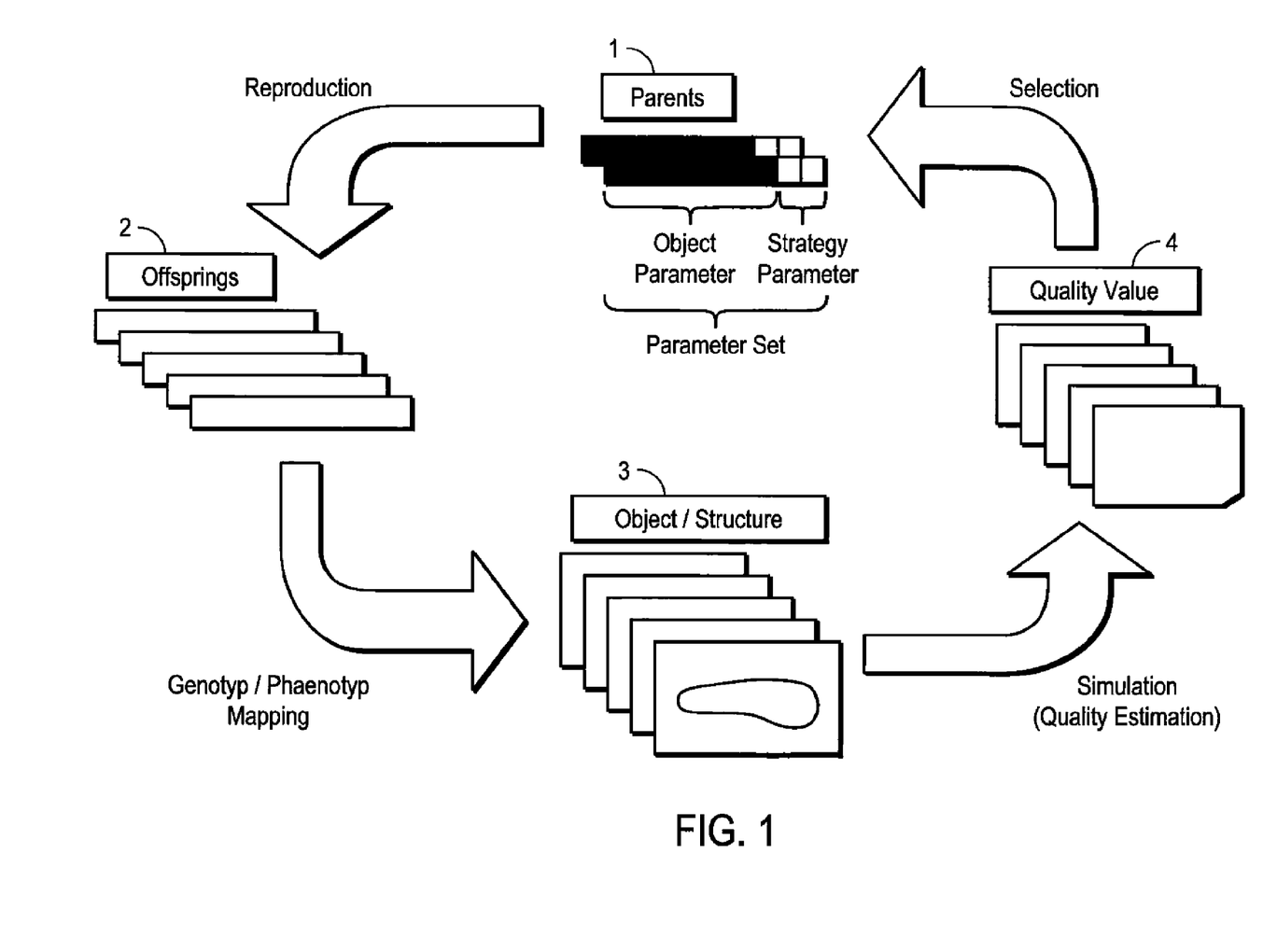
FIG. 1 shows a schematic representation of an evolutionary algorithm.
Figure 2:
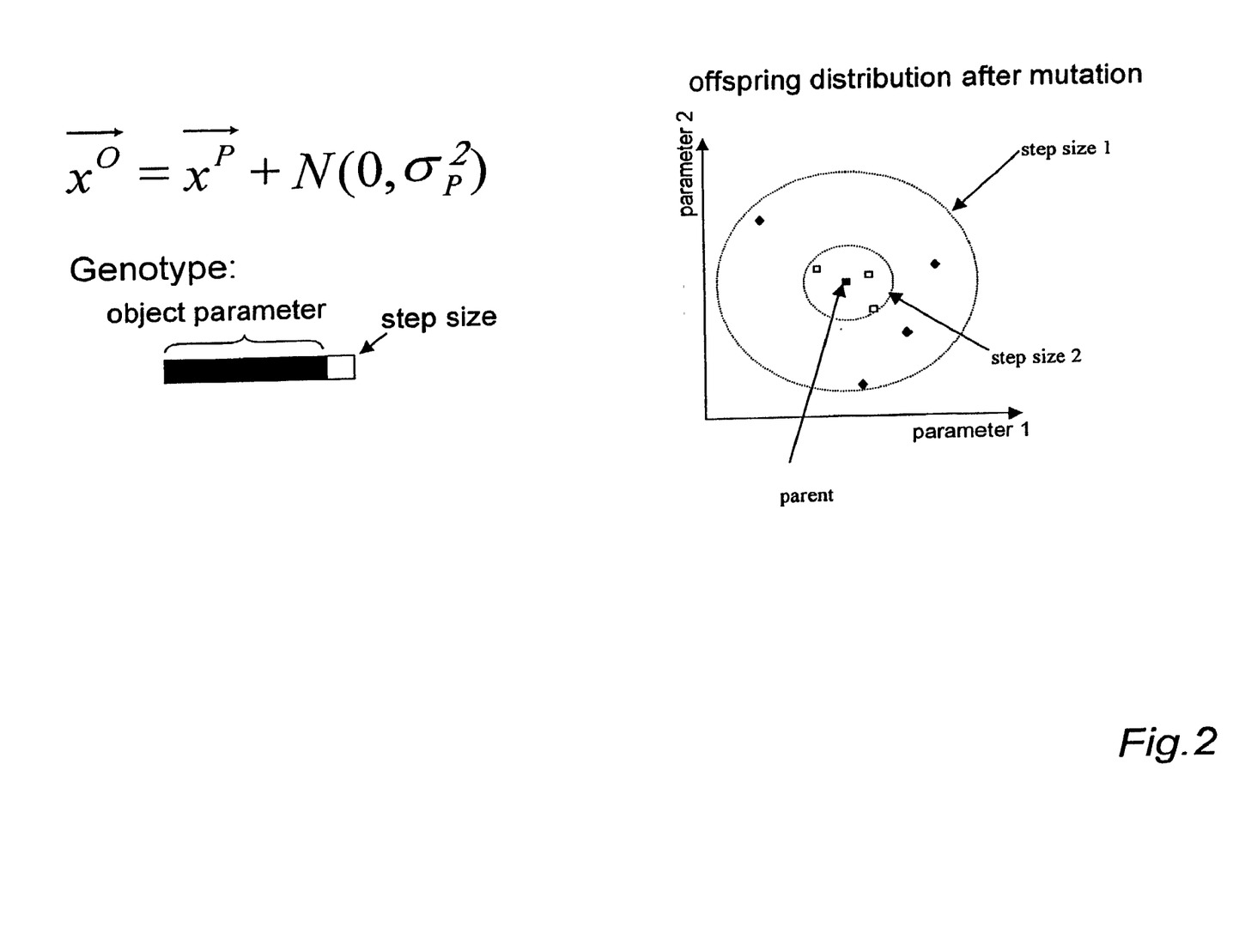
FIG. 2 is a graphic representation showing the influence of the strategy parameter value.

With reference to FIG. 1 at first the known cycle of an evolution strategy will be explained.

In a step 1 the object parameters to be optimized are encoded as real numbers in a vector called individual or chromosome. One individual can alternatively also consist of several vectors or chromosomes. A number of such individuals are generated that comprise the initial parent generation and the quality (fitness) of each individual in the parent generation is evaluated. In a step S2 the parents are reproduced by applying operators called mutation and recombination. Thus, a new generation is produced in step S3, which is called the offspring generation. The quality of the offspring individuals is evaluated using a fitness function which is the objective of the optimization in step S4. Finally, depending on the calculated quality value, step S5 selects (possibly stochastically) the best offspring individuals (survival of the fittest) which are used as parents for the next generation cycle if the termination condition in step S6 is not satisfied.

In particular for this application the real number vector, the object parameter, represents the coding for a spline which describes a two or higher dimensional body. This mapping from the parameter vector to the spline encoded structure is usually referred to as the genotype (=the parameter vector)–phenotype (=the two or higher dimensional body) mapping. In order to determine the fitness in step S4, first the genotype is mapped to the phenotype and then the quality of the phenotype is derived. A particular example is the parameterization of an airfoil (=the phenotype) by a real-valued vector (=genotype) describing a spline which determines the geometry of the airfoil. Finally, the quality of the airfoil can be determined, e.g. by methods known from computational fluid dynamics.

The mutation operator for the reproduction in step S2 is realized by adding normal or Gaussian distributed random numbers to the already existing elements of the parameter set, the so-called chromosome. The step size of the mutation can be controlled by modifying the variance of the normal or Gaussian probability density function. The variances are called strategy parameters. In higher dimensions the strategy parameters can consist of all or some entries of the covariance matrix of the higher dimensional Gaussian probability density function. This method to control the mutation by means of strategy parameters particularly distinguishes evolution strategy from other evolutionary algorithms like genetic algorithms (GA) or genetic programming (GP).

Appropriate values for the strategy parameters are important for the convergence of the algorithm. The appropriate values depend on the problem and the actual position in the solution space. To adapt the mutation width online, different adaptation strategies are used. Some simple methods are the $1/5$ rule (see Rechenberg) or the so-called mutative step size control. More complex methods are, for example, the de-randomized adaptation method or the co-variance matrix adaptation.

Evolution strategies have been shown to outperform other evolutionary algorithms like genetic algorithms or genetic programming for real-valued parameter optimization problems due to the above-mentioned possibilities of the adaptation or self-adaptation of the step size(s) of the mutation operator.

BRIEF SUMMARY OF THE INVENTION

A known problem for the application of evolution strategy to design optimization is that the number of parameters which describe the model (the so-called object parameters) is fixed in evolution strategy. Therefore, an automatic refinement of the phenotype represented by the object parameters during the optimization is impossible.

Figure 3:
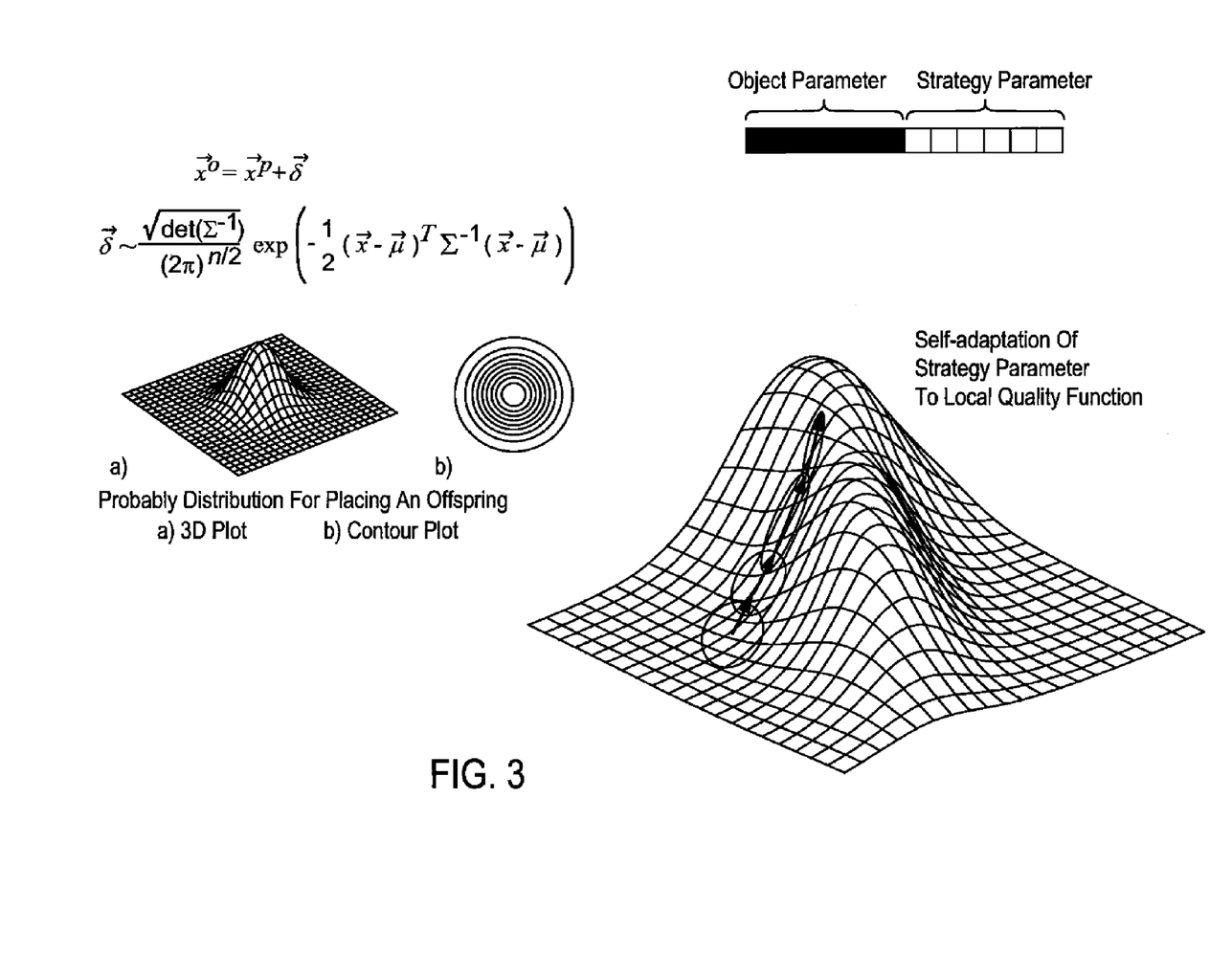
FIG. 3 shows the relation between the strategy parameter and the direction and step size of the evolution strategy process.

Mathematically, the mutation operation step can be expressed by the following equation (1):

$$\vec{x}^O = \vec{x}^P + N(\vec{0}, \vec{\sigma}_P) \qquad (1)$$

thereby $\vec{x}^O$ represents the parameter set of the offspring, $\vec{x}^P$ represents the parameter set of the parents and $N(\vec{0}, \vec{\sigma}_P)$ represents a vector whose elements are normal distributed random numbers with zero mean with variances $\sigma_{P,1}^2$. As can be seen from FIG. 3, a larger strategy parameter $\sigma_{P,1}$ increases the probability for larger steps in the offspring mutation.

More generally, the mutation operation can be represented by the following equation (2):

$$\vec{x}^O = \vec{x}^P + \vec{\delta} \qquad (2)$$

wherein $$\vec{\delta} \sim \frac{\sqrt{\det(\Sigma^{-1})}}{(2\pi)^{n/2}} \exp\left(-\frac{1}{2}(\vec{x}-\vec{u})^T \Sigma^{-1} (\vec{x}-\vec{u})\right) \qquad (3)$$

FIG. 3a and b show the resulting probability distribution for placing an offspring, wherein FIG. 3a shows a 3D-plot and 3b shows a contour-plot. $\delta$ is a random vector with a general Gaussian probability density function as specified in Eq. (3), if the covariance matrix $\Sigma$ is diagonal, Eq. (2) is reduced to Eq. (1) where the elements of the vector ($\vec{\sigma}_P$), the variances $\sigma_{P,1}^2$, are the diagonal elements of $\Sigma$.

Figure 4:
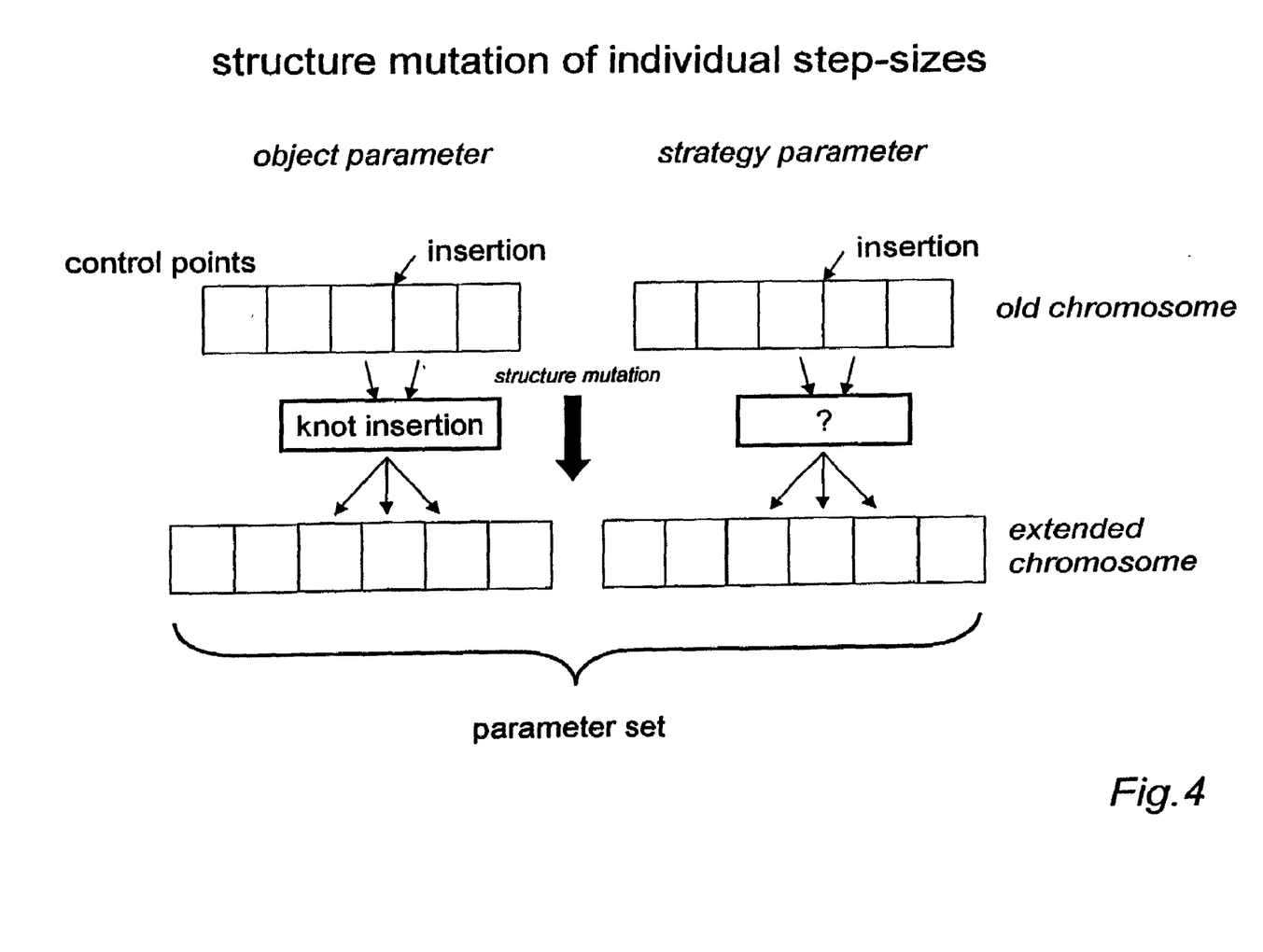
FIG. 4 shows schematically the structure mutation for individual step size adaptation of the strategy parameter. Note, that the neighboring control points and strategy parameters might also be affected by the structure mutation.

The covariance matrix $\Sigma$ has to be adapted to the local quality function. FIG. 4d shows the self-adaptation of the strategy parameters (covariance matrix $\Sigma$) to the local quality function. Particularly, FIG. 3c shows the result of four cycles of the reproduction process, wherein the 3d surface represents the quality function. By the self-adaptation of the strategy parameters to the local quality function regarding the direction and the step size a good convergence towards the absolute maximum of the local quality function can be achieved.

It is the object of the present invention to deal with the problem of variable parameter set length in evolution strategy in particular in context with the self-adaptation property of the strategy parameter set. With other words, the present invention proposes a technique for automatically refining the phenotype described by the parameter set during the optimization.

This object is achieved by means of the features of the independent claims. The dependent claims develop further the central idea of the present invention.

According to the present invention, the size of the describing parameter set during the evolution process can be adapted. For example, in the beginning a very small parameter set can be used to find a rough approximation of the optimal shape, which can be achieved very fast. During the optimization, the parameter set can be expanded to describe more and more complex shapes. However, the parameter set can not only be changed by inserting new object parameters and appropriate strategy parameters, but also by removing some parameters. This can be the case f.e. if an object parameter shows to be not sufficiently useful for further optimization.

When expanding the number of object parameters in the parameter sets, the associated number of strategy parameters has also to be expanded by inserting new strategy parameters. The present invention therefore proposes a technique for estimating the value of newly inserted strategy parameters.

According to a first aspect of the present invention therefore an optimization method based on an evolution strategy is proposed. A model, structure, shape or design to be optimized is thereby described by a parameter set comprising object parameters which are mutated and/or recombined to create offsprings of the parameter set. The quality of the offspring is then evaluated. The parameter set furthermore comprises at least one strategy parameter representing the variance of the mutation of associated object parameters. Thereby, the number of object parameters as well as the number of associated strategy parameters can be adapted during the optimization process.

For example the object parameters and strategy parameters can be selectively inserted and/or removed.

The value of a newly inserted strategy parameter can be estimated based on the information of strategy parameters of correlated object parameters.

The position and/or the time of a removal or an insertion of an object parameter and an associated strategy parameter can be determined by a random function.

The changes of the object parameter set and the associated strategy parameters can be performed such that it has no influence on the result of the evaluation step, thus the change of the parameters can be selectively neutral.

According to a further aspect of the present invention, an optimization method based on an evolution strategy is proposed. Thereby the structure of a parameter set defined by the number and/or position of the object parameters and strategy parameters can be mutated to create these offsprings.

According to a still further aspect of the present invention, a method for the optimization of spline coded problems is proposed. The object parameters in this case can comprise control and knot points, wherein new control points and strategy parameters can be inserted.

The values of newly inserted strategy parameters can be estimated on the basis of the values of the strategy parameters of neighboring control points.

According to a further aspect of the present invention, a method for optimizing spline coded shapes on the basis of an evolution strategy is proposed. Thereby a model, structure, shape or design to be optimized is described by a parameter set comprising object parameters representing control points and knot points of the spline coded shapes and at least one strategy parameter representing the variance of the mutation of associated object parameters. The object parameters and strategy parameters are mutated to create offsprings of the parameter set. Finally, the quality of the offsprings is evaluated. According to the invention, the step of mutating comprises the step of determination of a control point insertion position, insertion of the control point, adjustment of the knot vector, insertion of the appropriate strategy parameter for the inserted control point, weighted averaging of the strategy parameter values of the modified control points, and assigning the weighted average value as the value of the inserted strategy parameter.

According to a further aspect of the present invention, a computer software program for executing a method as said above is proposed.

Finally, the invention proposes the use of such a method for the optimization of the shape of aerodynamic or hydrodynamic structures.

Further features, objects and advantages of the present invention will become evident for the man skilled in the art when reading the following description of embodiments of the present invention when taken in conjunction with the figures of the enclosed drawings.

DETAILED DESCRIPTION OF THE PREFERRED EMBODIMENTS

The principles of evolution strategy have already been explained with reference to FIGS. 1 to 4. The general difference between the present invention and the prior art in evolution strategy is that the structure of the genotype, i.e., the structure of the parameter set including the strategy parameters, can also be mutated. With other words, both the number of object parameters and strategy parameters of a parameter set can be changed. Therefore, the optimization process can start with a relatively low number of parameters and the complexity of the parameter set can be refined during the optimization process.

Figure 5:
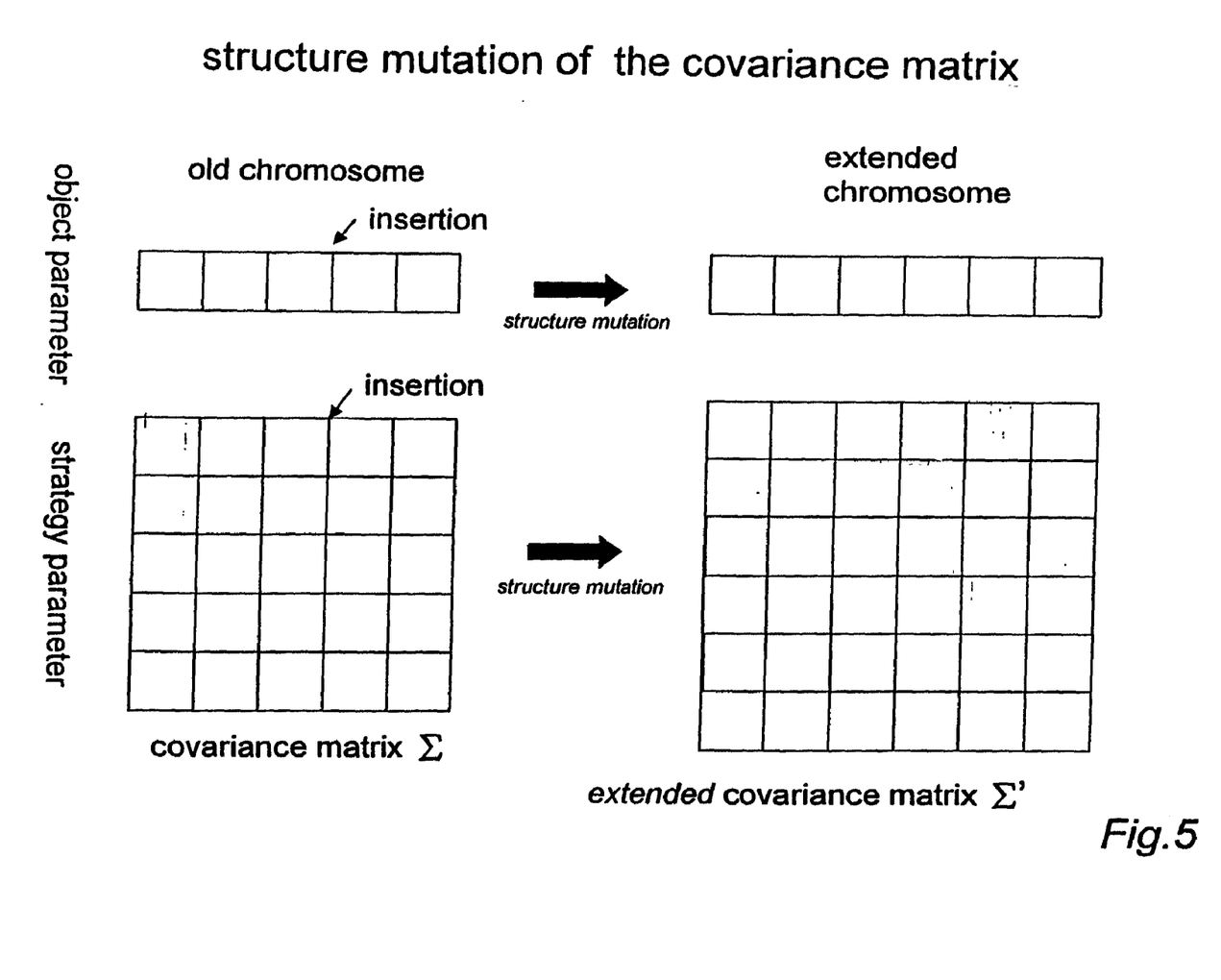
FIG. 5 shows schematically the structure mutation for the covariance matrix adaptation of the strategy parameter. Note, that the neighboring rows and columns in the covariance matrix might also be affected.

With reference to FIGS. 4 and 5, the time point and/or the location for the insertion of a new object parameter in the existing parameter set can be defined for example by means of a random function. When inserting a new object parameter, at the corresponding location of the strategy parameters a new strategy parameter is inserted such that the old "chromosome" (parameter set comprising object parameters and strategy parameters) is extended to a new chromosome. The concept shown in FIG. 4 refers to the so called individual mutative step size adaptation. Note, that neighboring object and strategy parameters might also change after the modification.

The structure mutation of the covariance matrix is schematically shown in FIG. 5. The strategy parameter according to this embodiment is represented as the covariance matrix $\Sigma$ (see equation (3) further above). When inserting a new object parameter in the old chromosome to create an extended chromosome, the covariance matrix $\Sigma$ is adapted by inserting a new row and a new column, thus generating a new expanded covariance matrix $\Sigma'$. The parameter set according to this representation is composed of the object parameter set and the strategy parameter, e.g. the co-variance matrix $\Sigma$. Note, that neighboring rows and columns of the covariance matrix might be affected by the modification.

Figure 10:
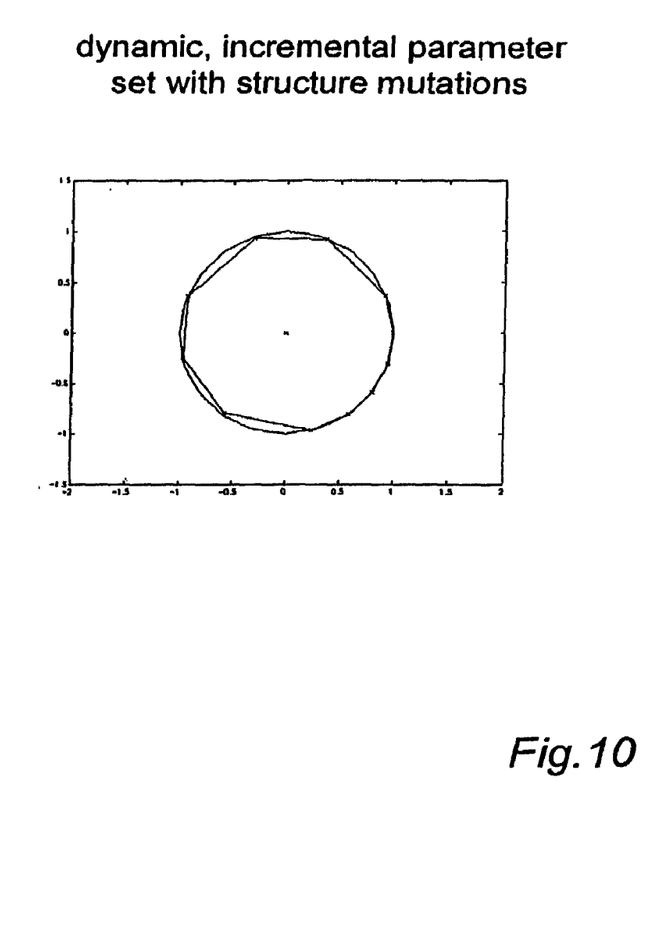

The present invention is for example applied to the field of optimization of spline coded problems. An example of a spline coded problem is shown in FIGS. 10 to 12. Typically in such spline coded problems, all attributes of the shape are encoded in the parameter set (control points, knot points which comprise the object parameters and the strategy parameters). Attributes which are not encoded cannot be represented and therefore cannot be subject of the optimization. As a consequence thereof, attributes cannot evolve during the optimization as long as they are not included in the parametric description of the parameter set.

The present invention now allows for an online modification of the parametric description (modification of the structure of the genotype) in order to allow new attributes in the encoding and therefore also in the shape (=the phenotype) to be inserted. Note, that the parameter set can not only be expanded by inserting new object and strategy parameters, but also be reduced by removing these parameters. This can be the case f.e. if an object parameter shows to be not sufficiently useful for further optimization.

As has already been said, one of the main advantages of the evolution strategies compared to other evolutionary algorithms is the use of the strategy parameters which can represent a preferred direction and step size for a further search. The strategy parameters are also adapted (mutated) in evolution strategies during the optimization to the local properties of the quality function. When new components (new control points in the case of spline coded problems) are inserted in the encoding or the encoding is modified, the values of the newly inserted strategy parameters have to be calculated.

According to the present invention, when determining a value of a newly inserted strategy parameter, the information of correlated components, e.g. the information of correlation parameters associated with correlated object parameters is used.

In the case of spline encoded structures, strategy parameters of new points are usually similar to strategy parameters of their neighboring points. Therefore, in the case of spline encoded structures, the strategy parameter value can be estimated from the strategy parameter values of neighboring control points.

The optimization process for a spline encoded problem or structure can therefore be represented in a simple way as follows:

definition of an initial spline encoding (object parameter set) for the geometric shape (for example hydrodynamic or aerodynamic bodies such as an airfoil) and of an initial strategy parameter set (f.e. covariance matrxi)

performing the steps of a standard evolution strategy for optimization introducing (possibly at random) new control point(s) in the spline encoding (new parameters) due to any predefined measure, f.e. stagnation of improvement with current encoding or as an additional mutation operator estimation of the new strategy parameter values based on existing strategy parameters, and continuation of the standard evolution strategy for optimization.

This process usable for example for spline encoded problems will now be explained with reference to FIG. 6.

In step S1 the initial encoding of the problem, for example represented by control and knot points, is set. In step S2 it is decided whether the encoding should be mutated. This decision can for example be triggered by a random function or a function that depends on the progress of the optimization. In case the result of step S2 is yes, in step S3 it is decided whether a new control point is to be inserted. If the answer of the decision step S3 is yes (which can be again decided on the basis of a random function or some kind of sensitivity analysis of the spline coding), the position for the newly to be inserted control point has to be found in step S4. Therefore the index i of the newly to be inserted point representing the position of the newly inserted point in the parameter set has to be found in step S4 and the new control point is inserted at the index i in step S5. Finally in a step S6, the value of the correspondingly to be inserted strategy parameters $strat_i$ is calculated. The value of the newly inserted strategy parameters $strat_i$ is a function $f(strat_{i-1}, strat_{i+1})$ of the values of the neighboring strategy parameters i−1 and i+1 or in more general terms a function of a subset of all old strategy parameters.

In case it is decided in step S3 to mutate the coding without insertion of a new control point, the removal position has to be chosen in step S7 and the corresponding control point is removed in step S8.

Finally, the parameter set including the control points, knot points and strategy parameter is mutated in step S9. The resulting structure of this mutation step S9 is then evaluated in step S10 using a so-called fitness function, f.e. measuring the fluid-dynamics properties of the spline coded shape.

In step S11, it is checked whether all individuals, i.e., all parameter sets (comprised of the object parameters and the strategy parameters) have been mutated. If this is not the case, the process goes back to step S2.

If the decision in S11 is positive, the n best individuals out of the m individuals generated in step S9 and evaluated in step S10 are selected in step S12 ("survival of the fittest"); this corresponds to a (n,m) selection, other selection methods like (n+M) or tournament selection, etc. can be applied. After the selection process, the optimization is either stopped, S13, in case some pre-defined criterion has been reached or a new generation is started with the reproduction step in S14 and a new mutation step in S1.

Figure 7:
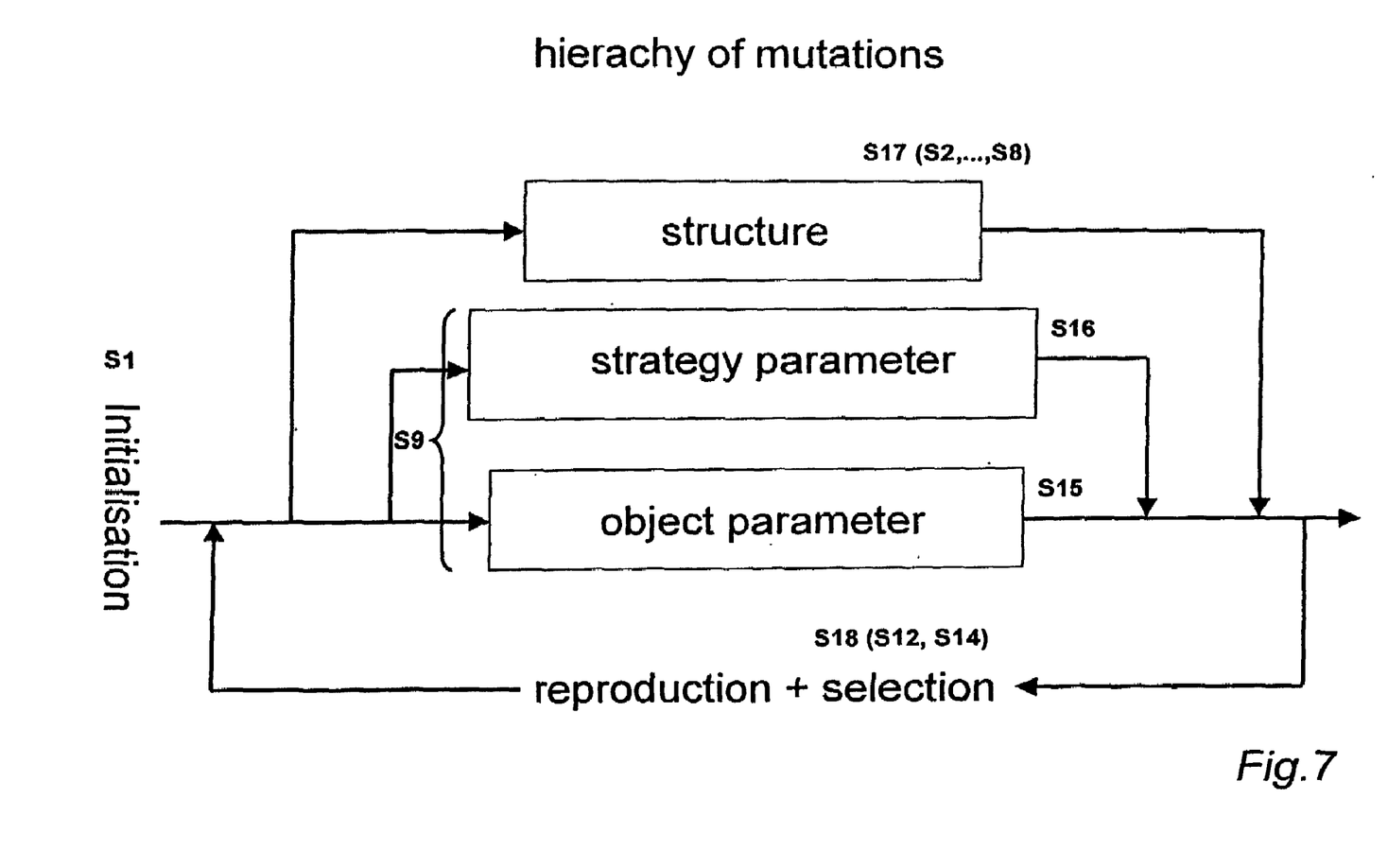
FIG. 7 shows different hierarchies of mutations.

FIG. 7 shows the different hierarchies of mutations possible according to the present invention.

The mutation of the parameter set (object parameters S15 and strategy parameters S16) in a step S9 is already known. However, according to the present invention, also the structure, e.g. the number and position of the object parameters and strategy parameters of the parameter set can be mutated in a step S17 (comprising the steps S2 to S8 in FIG. 6).

Figure 6:
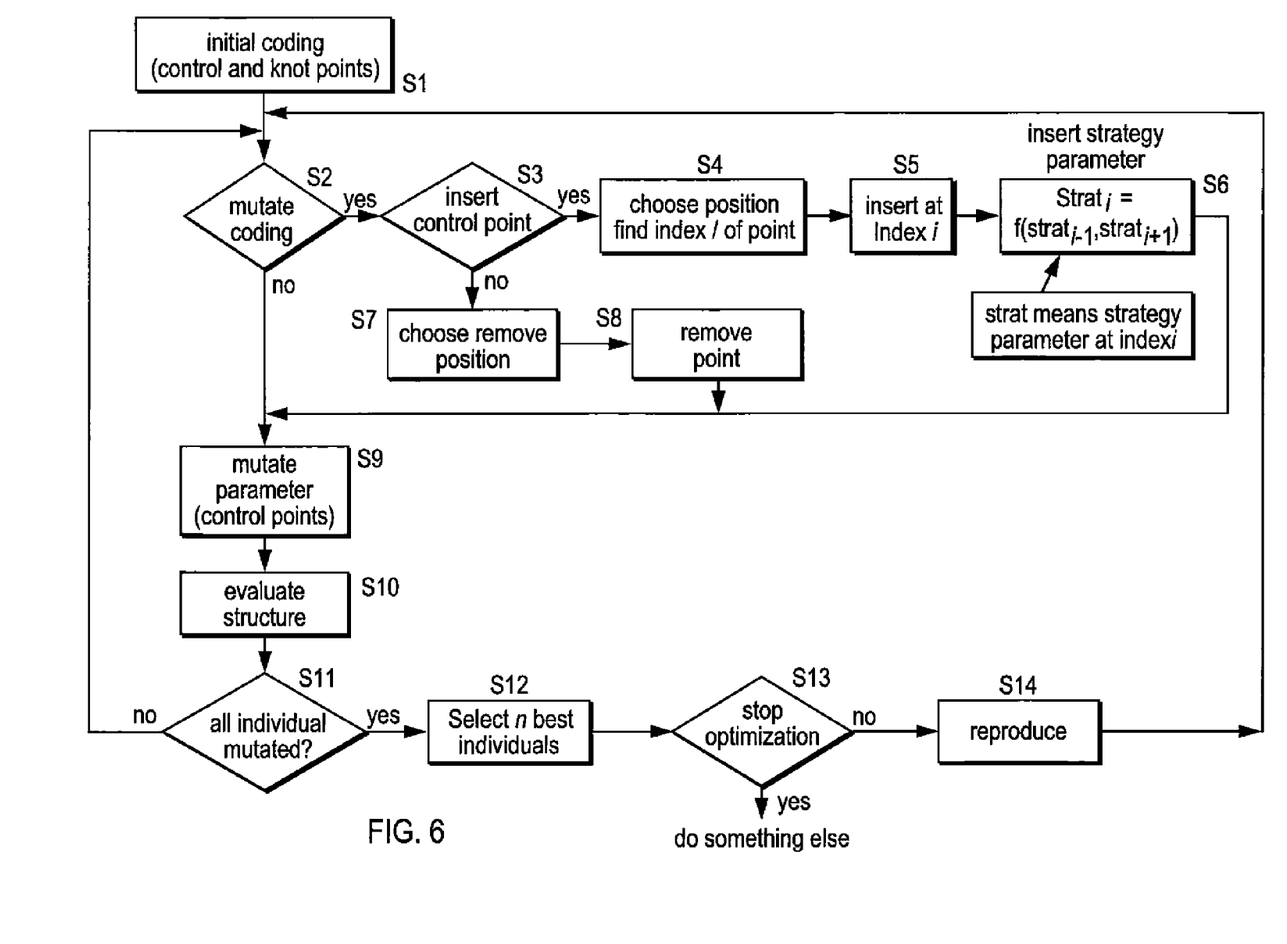
FIG. 6 shows a flow-chart for the process of adapting the structure of a parameter set by inserting/removing strategy and object parameters.
Figure 8:
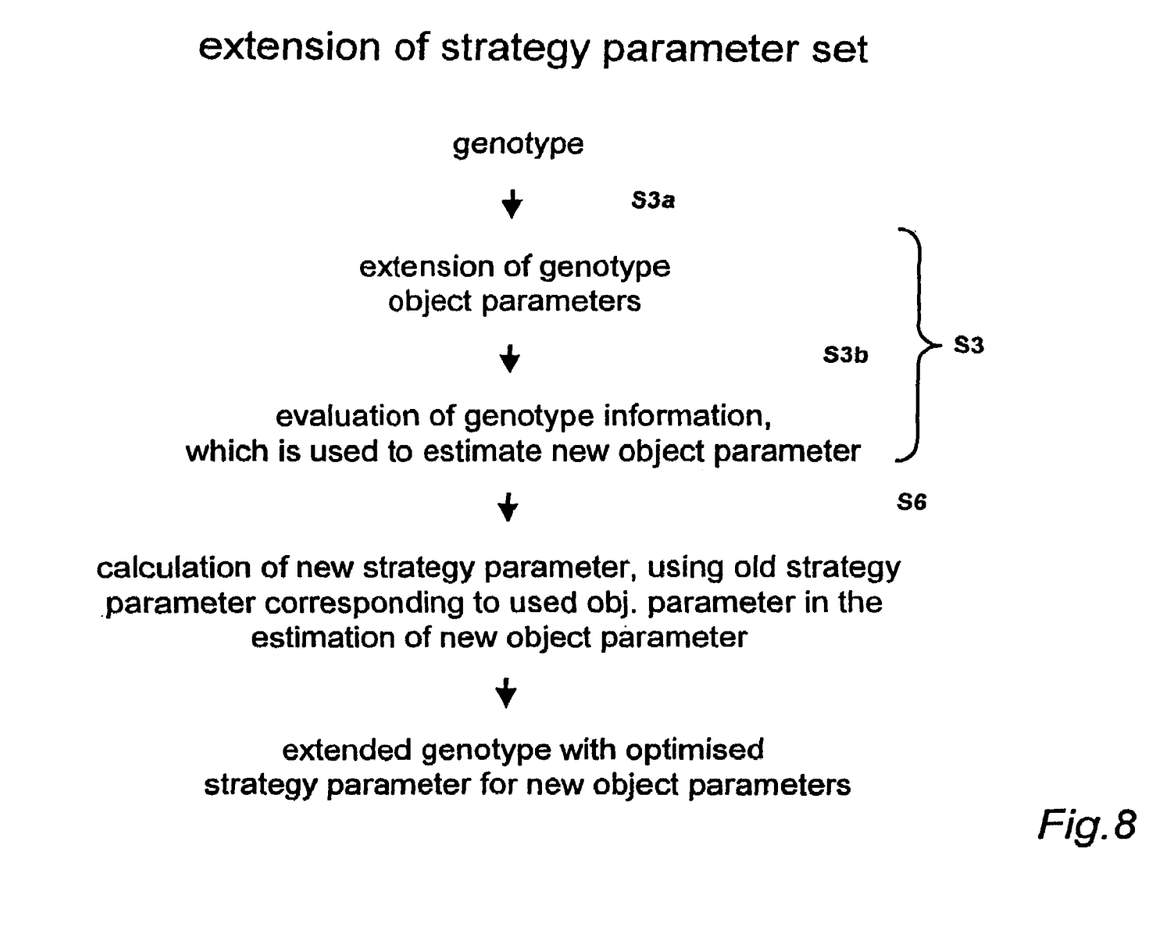
FIG. 8 is a schematic flow chart showing the mutation of the structure of a parameter set.

FIG. 8 summarizes the optimization processing as shown in FIG. 6. The genotype is first extended by inserting a new object parameter in step S3$a$. The value of this new parameter is estimated from the existing object parameter values in step S3$b$, f.e. in order to minimize the initial variation of the phenotype following the extension of the genotype. Once the position and the value of the new object parameter has been calculated in steps S3$a$ and S3$b$, the position and the value of the new strategy parameter is calculated using already present strategy parameters corresponding to the object parameters used in the estimation of the value for the new object parameter (step S3$b$).

Finally, an extended genotype with optimized strategy parameters for the new object parameters is generated.

Figure 9:
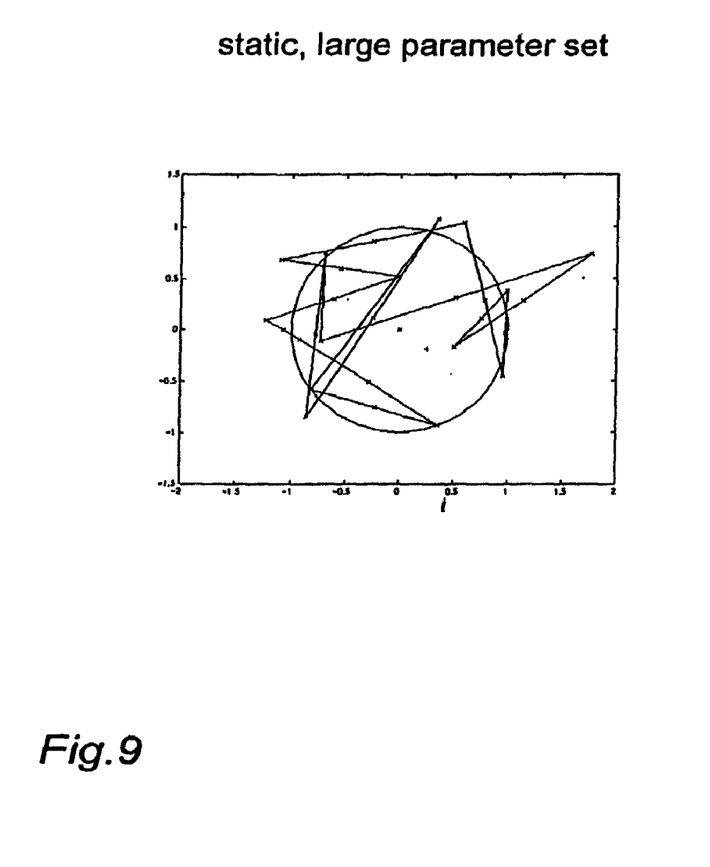
FIGS. 9 and 10 show an application example of the present invention: the optimization of spline coded shapes.

A simple example for the application of the present invention on a spline encoded structure is shown in FIGS. 9 and 10. The problem in this case is the approximation of a circle by a polygon with a fixed (FIG. 9) and a variable (FIG. 10) number of edges. The present invention (FIG. 10) has the advantage that this simple optimization process can be started with a structure with few parameters, f.e. a triangle, whose number is subsequently increased during the optimization. Due to the iterative development the evolution does not get stuck like in FIG. 9, where the degree of freedom is too large for the strategy parameters to adapt.

The mutation process for such spline encoded structures can be summarized as follows:
1. Based on a simple structure (small number of object parameters), a control point insertion position is determined.
2. The control point is inserted at the determined insert position.
3. The knot vector is changed according to the inserted control point.
4. To calculate the value of the new strategy parameter for the new control point, a weighted averaging of the strategy parameters of the neighboring control points is performed, and
5. The weighted average value is assigned as value for the new inserted strategy parameter.

According to the description, the present invention finds application for all structure encodings in which the optimal strategy parameter can be estimated from already existing strategy parameters.

Figure 11:
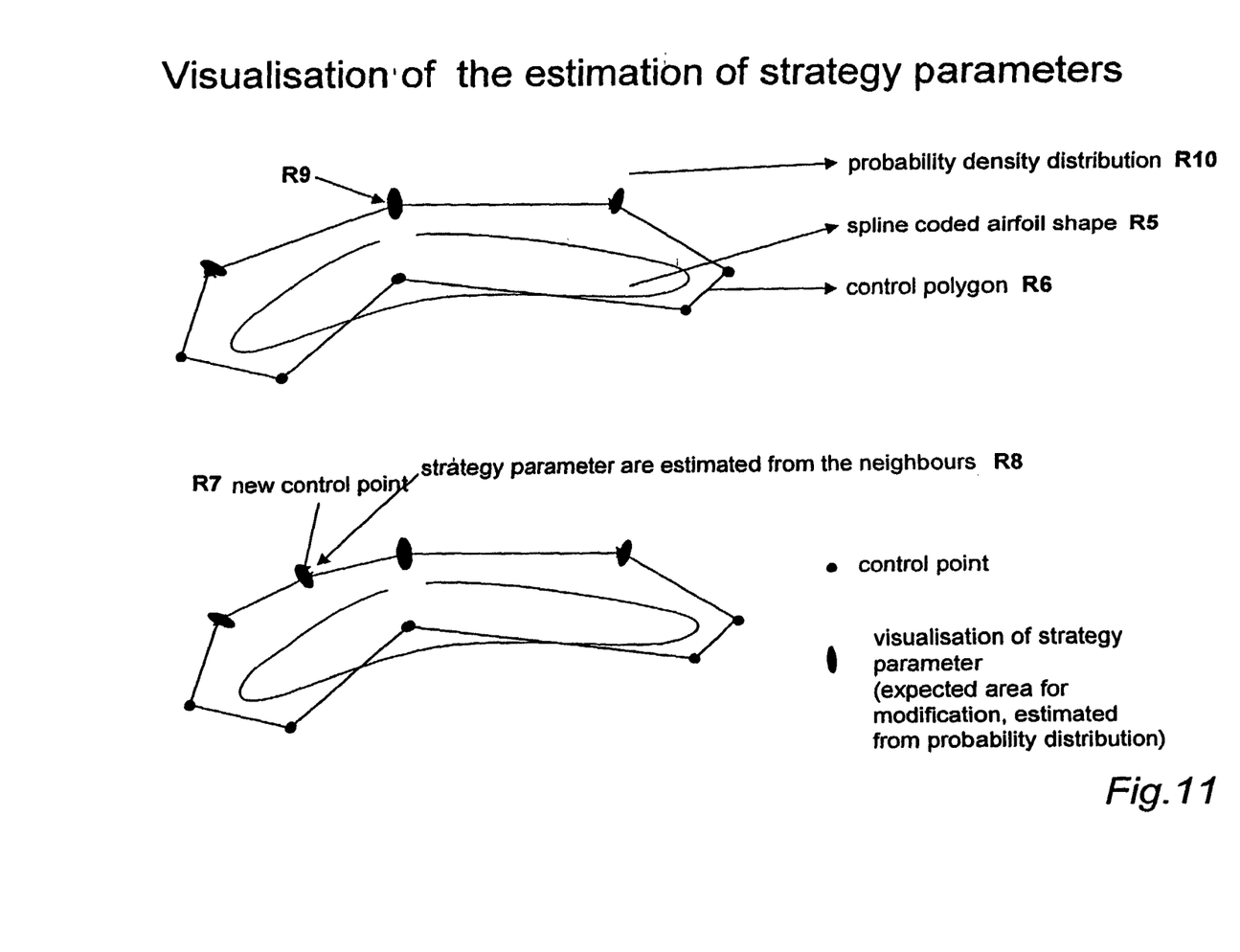
FIG. 11 shows the application of the present invention to the optimization of the shape of an aerodynamic or hydrodynamic body.

FIG. 11 visualizes the estimation of strategy parameters and the application of the present invention to the design of airfoils. R5 thereby designates the airfoil. R6 designates the control polygon for the spline which approximates the airfoil. R9 designates an already present control point and the ellipsoid R10 around this control point R9 visualizes the probability density distribution according to the strategy parameter which is the expected area for modification. R7 designates a new inserted control point having a strategy parameter R8 represented by the gray-shaded area.

Further examples for the application of the present invention apart from airfoil shapes are compressor/turbine blades for gas turbines (stator and rotor blades) and other aerodynamic or hydrodynamic structures. Other fields of application are architecture and civil engineering, computer science, wing design, engine valve design and scheduling problems.

What is claimed is:

1. A computer based method of optimizing one of a model, structure, shape or design representing an aerodynamic structure or a hydrodynamic structure based on an evolution strategy, comprising:
   describing one of the model, structure, shape or design representing an aerodynamic structure or a hydrodynamic structure to be optimized using a parameter set comprising a first number of object parameters;
   creating offsprings of the parameter set by modifying the object parameters, wherein said modifying includes at least one of mutating the object parameters and recombining the object parameters;
   evaluating quality of the offsprings;
   wherein the parameter set comprises at least one strategy parameter representing a step-size of the mutation of associated object parameters;
   modifying said first number of the object parameters to a second number of object parameters and modifying a first number of associated strategy parameters to a second number of associated strategy parameters during optimization to optimize one of said model, structure, shape or design; and
   storing one of said optimized model, optimized structure, optimized shape or optimized design in a computer storage.

2. The optimization method of claim 1 further comprising altering the object parameters and the strategy parameters, wherein said altering includes at least one of selectively inserting or removing an object parameter and a strategy parameter.

3. The optimization method of claim 2, further comprising estimating a value of a newly inserted strategy parameter based on information of strategy parameters associated with correlated object parameters.

4. The optimization method of claim 1, further comprising estimating a value of a newly inserted strategy parameter based on information of strategy parameters associated with correlated object parameters.

5. The optimization method of claim 1, further comprising determining a position of altering an object parameter and an associated strategy parameter using a random function.

6. The optimization method of claim 5, further comprising determining a time of altering the object parameter and the associated strategy parameter using a random function.

7. The optimization method of claim 1, further comprising determining a time of altering an object parameter and an associated strategy parameter using a random function.

8. The optimization method of claim 1, further comprising determining a position of altering an object parameter and an associated strategy parameter by progress of the evolutionary optimization.

9. The optimization method of claim 8, further comprising determining a time of said altering of said object parameter and the associated strategy parameter by the progress of the evolutionary optimization.

10. The optimization method of claim 8, further comprising determining a time of said altering of said object parameter and the associated strategy parameter by the progress of the evolutionary optimization.

11. The optimization method of claim 1, wherein the mutating of the object parameters does not directly influence the result of the evaluating step.

12. A computer based method of optimizing one of a model, structure, shape or design representing an aerodynamic structure or a hydrodynamic structure based on an evolution strategy, comprising:
describing one of the model, structure, shape or design representing an aerodynamic structure or a hydrodynamic structure to be optimized using a parameter set comprising a first number of object parameters;
creating offsprings of the parameter set by modifying the first number of object parameters to a second number of object parameters and modifying a structure of the parameter set, the structure of the parameter set defined by a number and position of the object parameters and strategy parameters; and
evaluating quality of the offsprings;
wherein the parameter set comprises at least one strategy parameter representing a step-size of the modification of associated object parameters; and
storing one of said optimized model, optimized structure, optimized shape or optimized design in a computer storage.

13. The optimization method of claim 12, wherein said step-size of the modification is a variance of a normal distribution.

14. The optimization method of claim 12, wherein said one of the model, structure, shape, or design is described using a spline.

15. The optimization method of claim 14, wherein the object parameters comprise control points and knot points, the method further comprising adapting a knot vector by inserting new control points and strategy parameters.

16. The optimization method of claim 15, further comprising estimating values of newly inserted strategy parameters based upon values of strategy parameters of neighboring control points.

17. A computer based method for optimizing a spline coded structure representing an aerodynamic structure or a hydrodynamic structure based on an evolution strategy, comprising:
describing the spline coded structure to be optimized using a parameter set comprising a first number of object parameters representing control points and knot points and at least one strategy parameter representing a step-size of a mutation of associated object parameters;
mutating the object parameters and strategy parameters to create offsprings of the set, comprising:
determining a control point insertion,
inserting the control point in the parameter set,
inserting an additional strategy parameter for the inserted control point,
determining the knot points modified by the insertion of the control point,
determining a weighted averaging of strategy parameter values of modified control points, and
assigning the weighted average value as a value of the inserted strategy parameter;
evaluating quality of the offsprings; and
storing the mutated object parameters and strategy parameters in a computer memory.

18. The method of claim 17, wherein said step-size of the mutation is a variance of a normal distribution.

19. The method of claim 1, wherein the model, structure, shape or design representing an aerodynamic structure or a hydrodynamic structure comprises one of:
an airfoil;
a spline coded structure;
a turbine blade for a gas turbine;
an aerodynamic structure; or
a hydrodynamic structure.

20. A computer program stored in a computer readable medium for performing the method of claim 1.

21. A computer program stored in a computer readable medium for performing the method of claim 12.

22. A computer program stored in a computer readable medium for performing the method of claim 17.

* * * * *